(12) United States Patent
Watanabe et al.

(10) Patent No.: US 11,022,253 B2
(45) Date of Patent: Jun. 1, 2021

(54) LIQUEFIED GAS-BASED RAPID COOLING POSSIBILITY DETERMINATION DEVICE, LIQUEFIED GAS STORAGE TANK, LIQUEFIED GAS CARRYING VESSEL, AND LIQUEFIED GAS-BASED RAPID COOLING POSSIBILITY DETERMINATION METHOD

(71) Applicant: MITSUBISHI SHIPBUILDING CO., LTD., Yokohama (JP)

(72) Inventors: Michihisa Watanabe, Tokyo (JP); Kazuhiro Hirota, Nagasaki (JP)

(73) Assignee: MITSUBISHI SHIPBUILDING CO., LTD., Yokohama (JP)

( * ) Notice: Subject to any disclaimer, the term of this patent is extended or adjusted under 35 U.S.C. 154(b) by 317 days.

(21) Appl. No.: 16/099,373

(22) PCT Filed: Apr. 28, 2017

(86) PCT No.: PCT/JP2017/016984
§ 371 (c)(1),
(2) Date: Nov. 6, 2018

(87) PCT Pub. No.: WO2017/199735
PCT Pub. Date: Nov. 23, 2017

(65) Prior Publication Data
US 2019/0211974 A1   Jul. 11, 2019

(30) Foreign Application Priority Data
May 16, 2016   (JP) .............................. JP2016-097769

(51) Int. Cl.
*F17C 13/02* (2006.01)
*B63B 25/16* (2006.01)
(Continued)

(52) U.S. Cl.
CPC ............ *F17C 13/026* (2013.01); *B63B 25/16* (2013.01); *B65D 90/12* (2013.01); *F17C 6/00* (2013.01);
(Continued)

(58) Field of Classification Search
CPC ...... F17C 2250/0439; F17C 2223/0123; F17C 2223/0161; F17C 2265/065;
(Continued)

(56) References Cited

U.S. PATENT DOCUMENTS 2,167,000 A  *  7/1939  Nilson ................... B65D 90/12
                                                          220/628
2,386,958 A  *  10/1945  Jackson ................... E04H 7/18
                                                            62/45.1
(Continued)

FOREIGN PATENT DOCUMENTS

JP           S49-124617 U      10/1974
JP           S58-119694 U       8/1983
(Continued)

OTHER PUBLICATIONS

PCT/ISA/210, "International Search Report for International Application No. PCT/JP2017/016984," dated Jul. 18, 2017.
(Continued)

*Primary Examiner* — Gail Kaplan Verbitsky
(74) *Attorney, Agent, or Firm* — Manabu Kanesaka; Benjamin Hauptman; Kenneth Berner

(57) ABSTRACT

The present invention provides a control device that includes a first temperature detection unit that detects a partition wall temperature of a tank main body in which liquefied gas is contained, and a second temperature detection unit that detects a temperature of a skirt that supports the tank main body. The control device further includes a temperature difference acquisition unit that acquires a temperature difference between the partition wall temperature detected by the first temperature detection unit and the temperature of the skirt which is detected by the second temperature detection unit, and a determination unit that determines whether or not a joint between the tank main body and the
(Continued)

skirt is rapidly cooled by the liquefied gas on the basis of the partition wall temperature and the temperature difference.

8 Claims, 6 Drawing Sheets

(51) Int. Cl.
  *F17C 6/00* (2006.01)
  *B65D 90/12* (2006.01)
  *F17C 13/00* (2006.01)
  *G01N 25/00* (2006.01)
(52) U.S. Cl.
  CPC .......... *F17C 13/004* (2013.01); *G01N 25/00* (2013.01); *F17C 2201/0128* (2013.01); *F17C 2201/052* (2013.01); *F17C 2203/0646* (2013.01); *F17C 2203/0648* (2013.01); *F17C 2205/0192* (2013.01); *F17C 2221/033* (2013.01); *F17C 2223/0161* (2013.01); *F17C 2223/033* (2013.01); *F17C 2227/04* (2013.01); *F17C 2250/03* (2013.01); *F17C 2250/0439* (2013.01); *F17C 2250/0491* (2013.01); *F17C 2250/0636* (2013.01); *F17C 2250/0694* (2013.01); *F17C 2250/07* (2013.01); *F17C 2260/025* (2013.01); *F17C 2270/0105* (2013.01)
(58) Field of Classification Search
  CPC ...... F17C 2250/0443; F17C 2250/0631; F17C 2227/0337; F17C 2260/023; F17C 2223/0153; F17C 2270/0105; F17C 2203/03; F17C 13/004; F17C 13/026; F17C 2250/03; B01D 15/161; G01N 30/30; G01N 2030/121; G01N 25/00; B65D 90/12
  USPC ..... 374/4, 5, 208, 45, 44, 29, 137, 110, 112, 374/30, 27
  See application file for complete search history.

(56) References Cited

U.S. PATENT DOCUMENTS

| | | | | | |
|---|---|---|---|---|---|
| 3,133,422 | A | * | 5/1964 | Paivanas | F17C 13/001 62/48.3 |
| 3,214,963 | A | * | 11/1965 | Meyer | B63B 25/16 73/49.2 |
| 3,270,910 | A | * | 9/1966 | Lusk | F17C 13/005 220/327 |
| 3,273,740 | A | * | 9/1966 | Herrenschmidt | F17C 3/025 220/560.05 |
| 3,507,242 | A | * | 4/1970 | Ulbricht | B63B 25/12 114/74 R |
| 4,312,700 | A | * | 1/1982 | Helmreich | C04B 35/52 264/300 |
| 4,405,243 | A | * | 9/1983 | Kuraoka | G01N 3/303 374/46 |
| 4,538,953 | A | * | 9/1985 | Abramson, Jr. | B66F 9/187 410/77 |
| 6,861,861 | B2 | * | 3/2005 | Song | G01R 31/2877 324/750.08 |
| 9,574,949 | B2 | * | 2/2017 | Belli | G01K 11/32 |
| 10,060,375 | B2 | * | 8/2018 | Takeuchi | F02M 21/0245 |
| 2008/0184926 | A1 | | 8/2008 | Koole et al. | |
| 2012/0023823 | A1 | * | 2/2012 | D'Agostini | F23G 5/32 48/197 R |
| 2013/0245772 | A1 | * | 9/2013 | Schroeder | B29C 48/08 623/18.11 |
| 2015/0260394 | A1 | * | 9/2015 | Zimmer | F23C 13/02 431/278 |
| 2016/0230687 | A1 | * | 8/2016 | Takeuchi | F02D 19/027 |
| 2017/0241639 | A1 | * | 8/2017 | Zimmer | F17C 7/04 |
| 2017/0254593 | A1 | * | 9/2017 | Gallagher | F27D 99/0033 |
| 2019/0368659 | A1 | * | 12/2019 | Rebernik | F17C 3/08 |
| 2020/0049150 | A1 | * | 2/2020 | Yoshimoto | F04D 29/5893 |
| 2020/0158288 | A1 | * | 5/2020 | Li | F17C 5/007 |
| 2020/0378556 | A1 | * | 12/2020 | Wowk | F17C 5/04 |

FOREIGN PATENT DOCUMENTS

| | | | |
|---|---|---|---|
| JP | S59-054900 A | | 3/1984 |
| JP | H05-302550 A | | 11/1993 |
| JP | H07-187056 A | | 7/1995 |
| JP | H09-329299 A | | 12/1997 |
| JP | 2004-003724 A | | 1/2004 |
| JP | 2009-127853 A | | 6/2009 |
| JP | 2013072870 A | * | 4/2013 |
| JP | 2013-079070 A | | 5/2013 |
| JP | 2015-039654 A | | 3/2015 |

OTHER PUBLICATIONS

PCT/ISA/237, "Written Opinion of the International Searching Authority for International Application No. PCT/JP2017/016984," dated Jul. 18, 2017.

* cited by examiner

LIQUEFIED GAS-BASED RAPID COOLING POSSIBILITY DETERMINATION DEVICE, LIQUEFIED GAS STORAGE TANK, LIQUEFIED GAS CARRYING VESSEL, AND LIQUEFIED GAS-BASED RAPID COOLING POSSIBILITY DETERMINATION METHOD

TECHNICAL FIELD

The present invention relates to a liquefied gas-based rapid cooling possibility determination device, a liquefied gas storage tank, a liquefied gas carrying vessel, and a liquefied gas-based rapid cooling possibility determination method.

Priority is claimed on Japanese Patent Application No. 2016-097769, filed May 16, 2016, the content of which is incorporated herein by reference.

BACKGROUND ART

A carrying vessel for carrying a liquefied gas such as liquefied natural gas (LNG) is equipped with a tank for containing the liquefied gas.

Such a tank is often supported on a bottom of a hull via a cylindrical support member called a skirt.

The tank and the support member are warmer in an empty state in which the liquefied gas is not stored in the tank than loaded liquefied gas. For example, when cryogenic liquefied gas is loaded in the tank in this state, the tank and the support member are cooled. In this case, the tank that is in direct contact with the liquefied gas is cooled before the support member. Since the tank shrinks due to cooling, when a temperature of the tank is abruptly lowered and the tank shrinks, great thermal stress may act on a joint between the tank and the support member.

A constitution in which the tank and the support member are gently precooled by spraying the liquefied gas into the tank from a spray pipe inside the tank little by little before the liquefied gas is loaded in order to prevent damage to the joint between the tank and the support member during loading is disclosed in Patent Document 1.

In this constitution, after the tank is precooled, for example, to about −100° C., the loading of the liquefied gas into the tank is started, and thereby occurrence of the great thermal stress due to the abrupt lowering of the temperature of the tank can be inhibited.

CITATION LIST

Patent Literature

[Patent Document 1]
Japanese Unexamined Patent Application, First Publication No. S59-54900

SUMMARY OF INVENTION

Technical Problem

However, for example, in the state in which a certain degree of liquefied gas remains in the tank, the tank and the support member are at a somewhat low temperature in a step before the loading, for example in the case where the liquefied gas is added and loaded in the tank. In this case, since a temperature difference between the tank and the support member is small, even if the liquefied gas is added and loaded in the tank in the state in which the temperature of the tank does not go down to about −100° C., excessive thermal stress may not act on the joint between the tank and the support member. In this case, since the tank is precooled, for example, to −100° C., start of the loading of the tank is delayed, and the work takes much time. Thus, it is required to properly determine whether or not the joint between the tank and the support member is rapidly cooled by the liquefied gas.

The present invention is directed to providing a liquefied gas-based rapid cooling possibility determination device, a liquefied gas storage tank, a liquefied gas carrying vessel, and a liquefied gas-based rapid cooling possibility determination method, capable of properly determining whether or not a joint between a tank and a support member is rapidly cooled by a liquefied gas.

Solution to Problem

According to a first aspect of the present invention, a liquefied gas-based rapid cooling possibility determination device includes a first temperature detection unit, a second temperature detection unit, a temperature difference acquisition unit, and a determination unit. The first temperature detection unit detects a temperature of a partition wall of a tank in which liquefied gas is contained. The second temperature detection unit detects a temperature of a support member that supports the tank. The temperature difference acquisition unit acquires a temperature difference between the temperature of the partition wall which is detected by the first temperature detection unit and the temperature of the support member which is detected by the second temperature detection unit. The determination unit determines whether or not a joint between the tank and the support member is rapidly cooled by the liquefied gas on the basis of at least two of the temperature of the partition wall, the temperature of the support member, and the temperature difference.

If the temperature difference between the temperature of the partition wall of the tank and the temperature of the support member is small, stress generated between the partition wall and the support member is lowered. For this reason, if the temperature difference between the temperature of the partition wall and the temperature of the support member is small even in the state in which the temperature of the partition wall does not go down in the determination unit, it can be determined that rapid cooling of the tank caused by the liquefied gas is possible.

Furthermore, the temperature difference between the partition wall and the support member by which it can be determined that the rapid cooling caused by the liquefied gas is possible differs depending on the temperature of the partition wall. For this reason, is determined whether or not the tank is rapidly cooled by the liquefied gas on the basis of at least two of the temperature of the partition wall, the temperature of the support member, and the temperature difference between the partition wall and the support member in the determination unit. Thereby, for example, a time required for precooling performed during loading of the liquefied gas can be shortened, and the loading of the liquefied gas can be started in an early stage.

According to a second aspect of the present invention, the first temperature detection unit according to the first aspect may be configured to form a part of the partition wall of the tank and to detect a temperature of a joining member to which the support member is joined.

In this way, the first temperature detection unit forms a part of the partition wall of the tank, and detects a temperature of a joining member to which the support member is joined. Thereby, the temperature of the partition wall can be detected at a position adjacent to the joint with the support member. Thereby, a change in temperature of the tank when the tank is precooled can be detected with high sensitivity. Therefore, a time required for precooling performed during loading of the liquefied gas can be shortened, and the loading of the liquefied gas can be started in an early stage.

According to a third aspect of the present invention, the second temperature detection unit according to the first or second aspect may be configured to detect a temperature of an upper part of the support member in the support member.

In this way, the second temperature detection unit detects a temperature of an upper part of the support member, and thereby a change in temperature at the time of thermal propagation between the partition wall and the support member of the tank during precooling can be detected at a position adjacent to the joint with the partition wall with high sensitivity. Therefore, it is appropriately determined whether or not the tank is rapidly cooled by the liquefied gas. For example, the time required for the precooling performed during the loading of the liquefied gas can be shortened, and the loading of the liquefied gas can be started in an early stage.

According to a fourth aspect of the present invention, the support member according to the third aspect may be configured such that an end thereof at a side joined to the partition wall has higher thermal conductivity than a portion thereof at a side separated from the partition wall.

In this way, the end of the support member at the side joined to the partition wall is formed of a material having higher thermal conductivity, and a temperature thereof is detected by the second temperature detection unit. Thereby, the change in temperature at the time of thermal propagation between the partition wall and the support member of the tank during precooling can be detected with higher sensitivity. Therefore, it is appropriately determined whether or not the tank is rapidly cooled by the liquefied gas. For example, the time required for the precooling performed during the loading of the liquefied gas can be shortened, and the loading of the liquefied gas can be started in an early stage.

According to a fifth aspect of the present invention, the determination unit according to one of the first to fourth aspects may be configured to determine whether or not the joint between the tank and the support member is rapidly cooled by the liquefied gas, on the basis of whether or not the temperature of the partition wall or the support member and the temperature difference are within a range within which stress generated at a joint between the partition wall and the support member when the tank is cooled by the liquefied gas is set to be lower than or equal to a predetermined reference value.

According to this constitution, if the temperature of the partition wall or the support member and the temperature difference are within a range within which stress generated at a joint between the partition wall and the support member is set to be lower than or equal to a predetermined reference value, the stress generated at the joint can be suppressed even if the joint is rapidly cooled by cryogenic liquefied gas. Therefore, it is appropriately determined whether or not the tank is rapidly cooled by the liquefied gas. For example, the time required for the precooling performed during the loading of the liquefied gas can be shortened, and the loading of the liquefied gas can be started in an early stage.

According to a sixth aspect of the present invention, the determination unit according to the fifth aspect may be configured to determine that rapid cooling of the tank caused by the liquefied gas into the tank is possible when the temperature of the partition wall is lower than or equal to the predetermined reference value.

With this constitution, for example, if the temperature of the partition wall is lower than or equal to the predetermined reference value even in the state in which the temperature difference between the temperature of the partition wall of the tank and the temperature of the support member is large, the stress generated at the joint can be suppressed even if the loading of the liquefied gas into the tank is started.

According to a seventh aspect of the present invention, a liquefied gas storage tank includes: a tank main body configured to store liquefied gas; a support, member configured to support the tank main body; a precooling part configured to precool the tank main body; a gas feeder configured to feed the liquefied gas to the tank main body; and the liquefied gas-based rapid cooling possibility determination device of any one of the first to sixth aspects.

With this constitution, if the temperature difference between the temperature of the partition wall of the tank main body and the temperature of the support member becomes small, the stress generated between the partition wall and the support member can be suppressed to be lowered. For this reason, if the temperature difference between the temperature of the partition wall and the temperature of the support member becomes small even if the temperature of the partition wall does not go down in the determination unit, it can be determined that the rapid cooling caused by the liquefied gas is possible. In this way, it is properly determined whether or not the tank is rapidly cooled by the liquefied gas. The time required for the precooling perforated during the loading of the liquefied gas can be shortened, and the loading of the liquefied gas can be started in an early stage.

According to an eighth aspect of the present invention, a liquefied gas carrying vessel includes: the liquefied gas storage tank of the seventh aspect; and a hull in which the liquefied gas storage tank is mounted.

With this constitution, it is appropriately determined whether or not the tank is rapidly cooled by the liquefied gas. The time required for the precooling performed during the loading of the liquefied gas can be shortened, and the loading of the liquefied gas can be started in an early stage.

According to a ninth aspect of the present invention, a liquefied gas-based rapid cooling possibility determination method includes: a process of detecting a temperature of a partition wall of a tank in which liquefied gas is contained; and a process of detecting a temperature of a support member that supports the tank. The liquefied gas-based rapid cooling possibility determination method further includes; a process of acquiring a temperature difference between the temperature of the partition wall and the temperature of the support member; and a process of determining whether or not a joint between the tank and the support member is rapidly cooled by the liquefied gas, on the basis of at least two of the temperature of the partition wall, the temperature of the support member, and the temperature difference.

With this constitution, it is appropriately determined whether or not the tank is rapidly cooled by the liquefied gas. For example, the time required for the precooling performed during the loading of the liquefied gas can be shortened, and the loading of the liquefied gas can be started in an early stage.

Advantageous Effects of Invention

According to the liquefied gas-based rapid cooling possibility determination device, the liquefied gas storage tank, the liquefied gas carrying vessel and the liquefied gas-based rapid cooling possibility determination method, it can be properly determined whether or not the joint between the tank and the support member is rapidly cooled by the liquefied gas.

DESCRIPTION OF EMBODIMENTS

First Embodiment

Next, a carrying vessel according to a first embodiment of the present invention will be described with reference to the drawings.

Figure 1:
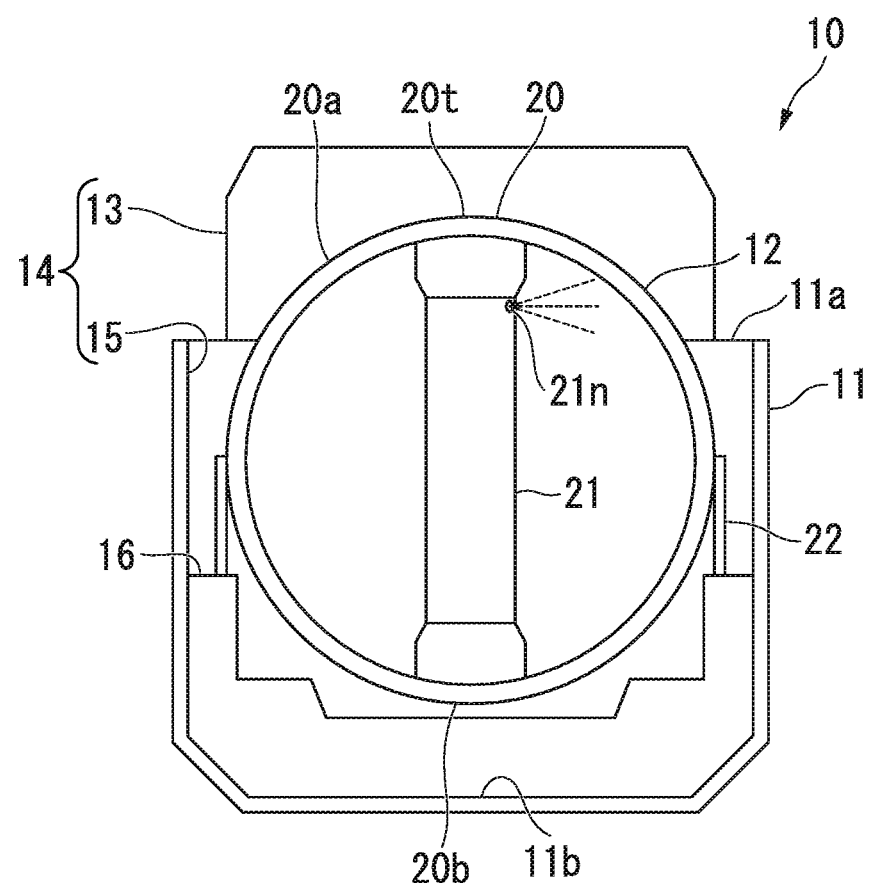
FIG. 1 is a sectional view of a tank provided in a carrying vessel in a first embodiment of the present invention.

FIG. 1 is a sectional view of a tank provided in a carrying vessel in a first embodiment of the present invention.

A carrying vessel (a liquefied gas carrying vessel) 10 of the present embodiment carries a liquefied gas such as liquefied natural gas (LNG).

As shown in FIG. 1, the carrying vessel 10 includes at least a hull 11 and a tank (a liquefied gas storage tank) 12.

The hull 11 includes a tank housing 14 that is formed of steel and forms a so-called hold space in which the tank 12 is housed. The tank housing 14 includes a housing recess 15 and a tank cover 13.

The housing recess 15 is recessed toward a lower bottom 11b with respect to the upper deck 11a, and opens upward. A plurality of tanks 12 are arranged in the housing recess 15 in parallel from the bow toward the stern of the hull 11.

The tank cover 13 mainly covers an upper part of the tank 12. The tank cover 13 is provided on the upper deck 11a of the hull 11. The tank cover 13 is formed in a shape that is curved upward.

Each tank 12 includes a tank main body 20 and a skirt (a support member) 22 that supports the tank main body 20.

The liquefied gas that is a carrying target is housed in the tank main body 20. The tank main body 20 is formed of a partition wall that partitions the inside and outside thereof.

The tank main body 20 is formed of, for example, an aluminum alloy, and has a spherical shape. The tank main body 20 is not limited to the spherical shape. The tank main body 20 may have, for example, a shape in which a vertical sectional shape is long in a vertical direction by forming a middle part thereof in a vertical direction in a tube or conical frustum shape having a constant diameter and forming upper and lower parts of the middle part in hemispherical shapes.

A pipe tower (a gas feeder) 21 that extends from a bottom 20b toward a top 20t of the tank main body 20 and has a hollow tube shape is provided in the tank main body 20. An upper part of the pipe tower 21 is provided with a spray nozzle (a precooling part) 21n that sprays the liquefied gas of the same type as the carrying target as a coolant into the tank main body 20 in order to precool the tank main body 20.

The liquefied gas of the carrying target is fed from the bottom 20b of the tank main body 20 through a gas feed pipe (not shown), and is thereby stored in the tank main body 20.

An outer surface of this tank main body 20 is covered with a heat insulator (not shown).

The skirt 22 is provided on a foundation deck 16 provided on the housing recess 15 in a cylindrical shape. The skirt 22 supports the tank main body 20 such that an upper part 20a of the tank main body 20 protrudes upward from the upper deck 11a of the hull 11.

Figure 2:
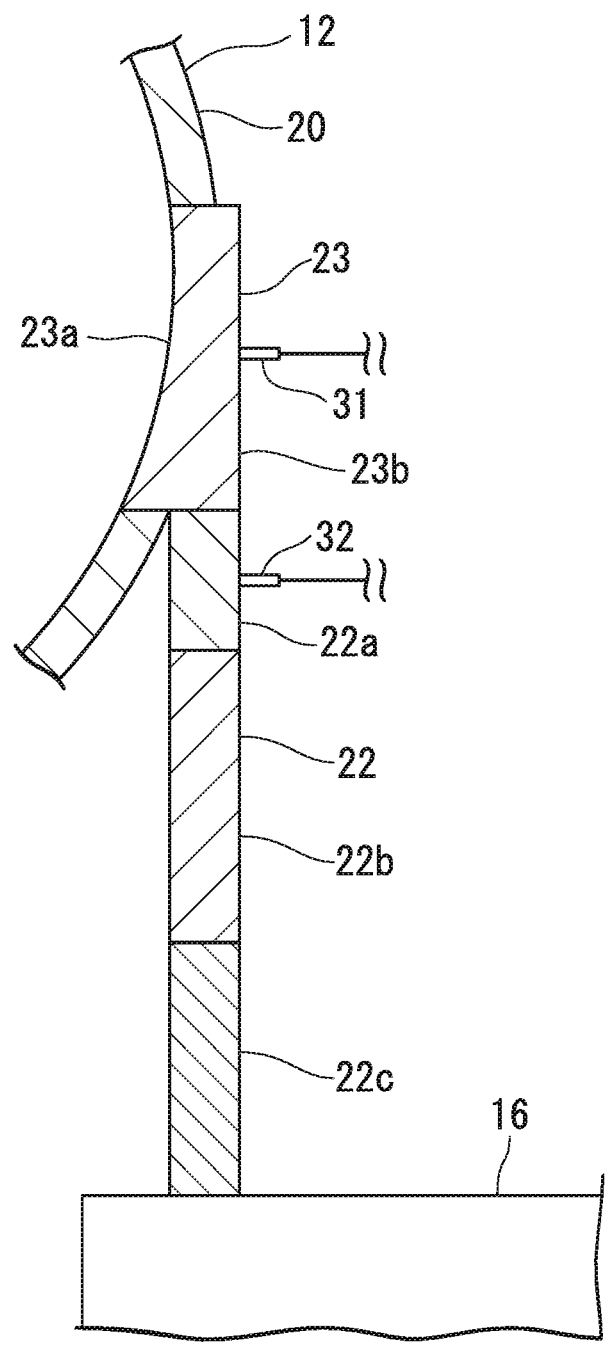
FIG. 2 is an enlarged sectional view showing a constitution of a joint between a tank main body that constitutes the tank and a skirt that supports the tank main body in the first embodiment of the present invention.

FIG. 2 is an enlarged sectional view showing a constitution of joint between the tank main body and the skirt that supports the tank main body in the first embodiment of the present invention.

As shown in FIG. 2, the skirt 22 is joined to a joining member 23 provided on the tank main body 20. The joining member 23 is provided at a portion to which the skirt 22 is joined in the tank main body 20. The portion to which the skirt 22 is joined is, for example, a maximum diameter part (a so-called equatorial portion) in a vertical direction of the spherical tank main body 20 in the example of FIG. 2. The joining member 23 integrally includes a main body part 23a that forms a part of the partition wall of the tank main body 20, and a skirt joint 23b which branches off from the main body part 23a and extends downward and to which the skirt 22 is joined. The joining member 23 is formed of the same material as the tank main body 20.

The skirt 22 has an upper part 22a that is joined to the skirt joint 23b of the joining member 23 and is formed of an aluminum alloy. A lower part 22c of the skirt 22 joined to the foundation deck 16 is formed of steel that is the same material as the foundation deck 16 or the hull 11. In the skirt 22, a middle part 22b between the upper part 22a and the lower part 22c is formed of a material that has lower thermal conductivity than the upper part 22a, for example a stainless steel alloy.

Figure 3:
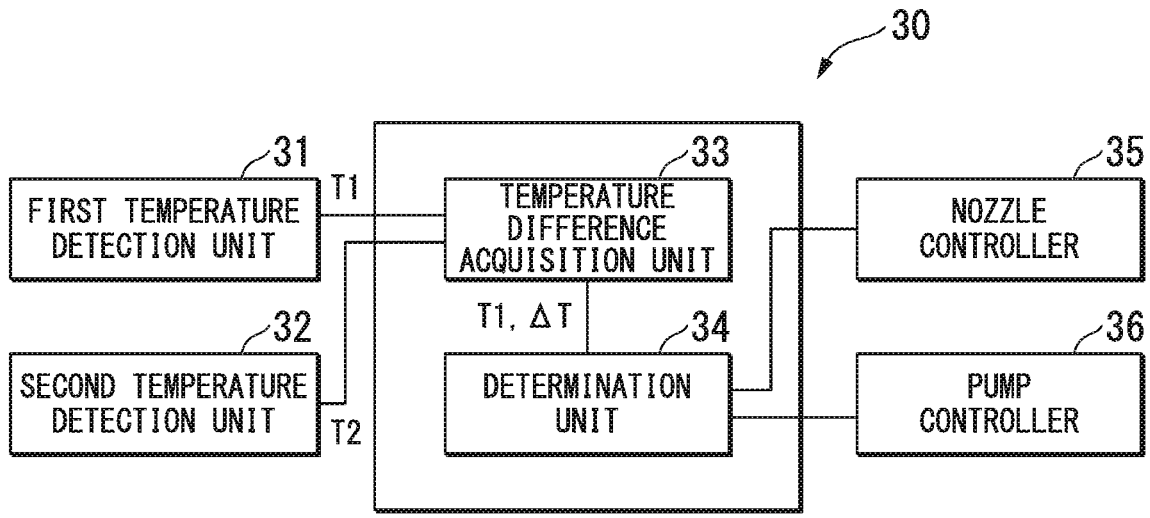
FIG. 3 is a view showing a functional constitution of a control device in the first embodiment of the present invention.

FIG. 3 is a view showing a functional constitution of a control device in the first embodiment of the present invention.

Each tank 12 includes a control device (a liquefied gas-based rapid cooling possibility determination device) 30 (see FIG. 3) that controls loading of the liquefied gas to be carried into the tank main body 20.

As shown in FIG. 3, the control device 30 includes a first temperature detection unit 31, a second temperature detection unit 32, a temperature difference acquisition unit 33, a determination unit 34, a nozzle controller 35, and a pump controller 36.

The first temperature detection unit 31 detects a temperature of the partition wall of the tank main body 20. In the present embodiment, as shown in FIG. 2, the first temperature detection unit 31 is provided to detect, for example, a temperature of the main body part 23a of the joining member 23 as a partition wall temperature (a temperature of the partition wall) T1.

The second temperature detection unit 32 detects a temperature of the skirt 22. In the present embodiment, the second temperature detection unit 32 is formed of a material that has high thermal conductivity in the skirt 22, and is provided to detect a temperature of the upper part 22a adjacent to the skirt joint 23b as a skirt temperature T2.

As shown in FIG. 3, the temperature difference acquisition unit 33 calculates a temperature difference ΔT (=T1−T2) between the partition wall temperature T1 of the tank main body 20 which is detected by the first temperature detection unit 31 and the skirt temperature T2 of the skirt 22 which is detected by the second temperature detection unit 32.

The determination unit 34 determines whether or not it is possible to feed the liquefied gas acting as the carrying target into the tank main body 20.

The nozzle controller 35 controls ON/OFF of a spraying operation of a liquefied precooling gas (a coolant) from a spray nozzle 21n (see FIG. 1).

The pump controller 36 controls ON/OFF of a feeding operation of the liquefied gas into the tank main body 20 from a gas feed pipe (not shown).

Figure 4:
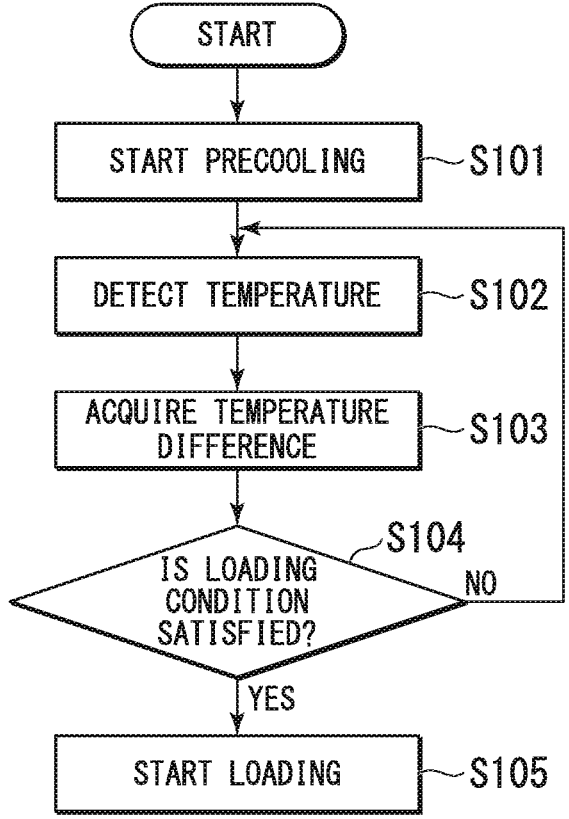
FIG. 4 is a flow chart for control when the tank main body is precooled in the first embodiment of the present invention.

FIG. 4 is a flow chart for control when the tank main body is precooled in the first embodiment of the present invention.

As shown in FIG. 4, before the liquefied gas is loaded into the tank main body 20, precooling of the tank 12 is started (step S101). Here, the liquefied gas of the same type as the liquefied gas to be carried is sprayed from the spray nozzle 21n in the tank main body 20 as the coolant by the nozzle controller 35 in the control device 30. Thereby, the tank main body 20 is cooled. Furthermore, the skirt 22 is cooled from the tank main body 20 via the joining member 23.

The control device 30 detects the partition wall temperature T1 of the tank main body 20 and the skirt temperature T2 of the skirt 22 at the first temperature detection unit 31 and the second temperature detection unit 32 at regular predetermined time intervals (step S102).

Next the control device 30 calculates (acquires) a temperature difference ΔT (=T1−T2) between the partition wall temperature T1 of the tank main body 20 which is detected by the first temperature detection unit 31 and the skirt temperature T2 of the skirt 22 which is detected by the second temperature detection unit 32 in the temperature difference acquisition unit 33 (step S103).

Subsequently, the determination unit 34 determines whether or not rapid cooling caused by the liquefied gas to be carried into the tank main body 20 is possible on the basis of the partition wall temperature T1 of the tank main body 20 which is detected in step S102 and the temperature difference ΔT between the partition wall temperature T1 of the tank main body 20 and the skirt temperature T2 of the skirt 22 which is detected in step S103 (step S104).

Here, the determination unit 34 determines whether or not a predetermined precooling completion condition is satisfied on the basis of a correlation map between the partition wall temperature T1 and the temperature difference ΔT.

Figure 5:
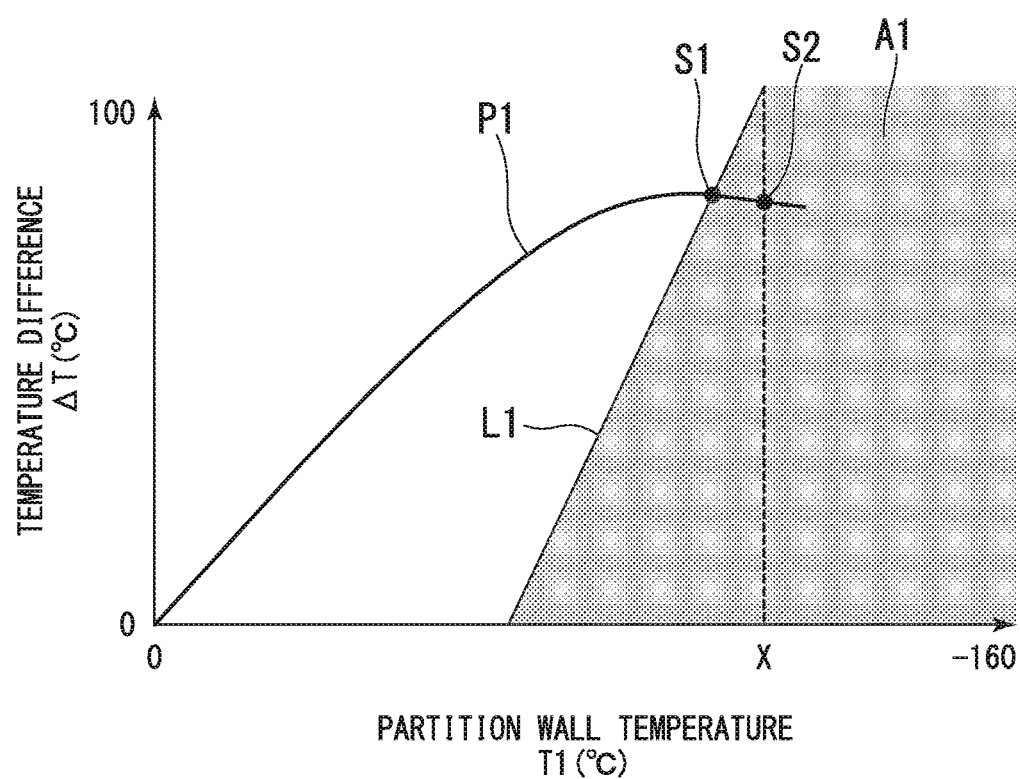
FIG. 5 is a view showing an example of a correlation map between a partition wall temperature and a temperature difference wherein the correlation map indicates a range in which stress generated at a joint between a partition wall and a support member when liquefied gas is loaded into the tank main body is lower than or equal to a predetermined reference value.

FIG. 5 is a view showing an example of the correlation map between the partition wall temperature and the temperature difference wherein the correlation map indicates a range in which stress generated at the joint between the partition wall and the support member when the liquefied gas is loaded into the tank main body is lower than or equal to a predetermined reference value.

In FIG. 5, a threshold line L1 is expressed by, for example, Formula (1) below.

$$Y = a \times X + b \quad (1)$$

Here, a and b are preset coefficients.

The threshold line L1 sets a boundary between a range A1 between the partition wall temperature T1 and the temperature difference ΔT and a range other than the range A1, at which stress generated at a joint between the main body part 23a of the joining member 23 and the skirt 22 when the liquefied gas is loaded into the tank main body 20 is lower than or equal to a predetermined reference value.

In the correlation map shown in FIG. 5, if a point determined by the partition wall temperature T1 and the temperature difference ΔT detected and acquired in steps S102 and S103 goes beyond the threshold line L1, and falls within the range A1 that satisfies the precooling completion condition, the determination unit 34 determines that a loading condition of the liquefied gas into the tank main body 20 is satisfied, and the loading is possible.

In this case, when the pump controller 36 receives an output signal from the determination unit 34, the pump controller 36 switches on a pump (not shown) that feeds the liquefied gas into the tank main body 20 from a gas feed pipe (not shown). Thereby, the loading of the liquefied gas into the tank main body 20 is started (step S105).

In this case, the nozzle controller 35 may be configured to stop the spraying operation of the precooling coolant from the spray nozzle 21n, and to stop precooling treatment of the tank main body 20.

In this case, since the temperature difference ΔT between the tank main body 20 and the skirt 22 is suppressed when the loading of the liquefied gas is started, even if the tank main body 20 is subjected to shrinking deformation by the loading of the liquefied gas, a difference in amounts of deformation between the tank main body 20 and the skirt 22 is small. Therefore, the stress acting on the joint between the tank main body 20 and the skirt 22 can be suppressed.

In FIG. 5, a change curve P1 shows an example of a change between the partition wall temperature T1 and the temperature difference ΔT when the precooling treatment of the tank main body 20 is performed. According to the change curve P1, when the precooling of the tank main body 20 is started, the tank main body 20 is reduced in temperature before the skirt 22, and thus the temperature difference ΔT is increased. Afterward, the reduction in temperature of the tank main body 20 propagates to the skirt 22, and once a reduction in temperature of the skirt 22 starts, the temperature difference ΔT becomes small. In an example of the change curve P1, when the temperature difference ΔT becomes small (a point S1 in FIG. 5), the change curve P1 goes beyond the threshold line L1.

In contrast, in the case of a comparative example in which the possibility of the rapid cooling caused by the liquefied gas is determined only by the partition wall temperature T1, for example, when the partition wall temperature T1 is lower than or equal to a threshold temperature X in the change curve P1 (point S2 in FIG. 5), the loading of the liquefied gas is permitted.

In this way, the determination treatment based on the partition wall temperature T1 and the temperature difference ΔT is performed, and thereby the loading of the liquefied gas can be started in an earlier stage.

Therefore, according to the aforementioned first embodiment, it can be determined, whether or not the joint between the tank main body 20 and the skirt 22 is rapidly cooled by the liquefied gas on the basis of the partition wall temperature T1 of the tank main body 20 and the temperature difference ΔT between the partition wall temperature T1 and the skirt temperature T2 of the skirt 22. For his reason, it is determined in the determination unit 34 that, even in the state in which the partition wall temperature T1 does not go down to the threshold temperature X (for example −100° C.) used as, for example, a conventional precooling completion condition, if the temperature difference ΔT between the partition wall temperature T1 and the skirt temperature T2 of the skirt 22 is small, the rapid cooling of the tank main body 20 caused by the liquefied gas is possible, and the loading of the liquefied gas is possible. In this way, a time required for the precooling performed during the loading of the liquefied gas can be shortened, and the loading of the liquefied gas to the tank main body 20 can be started in an early stage. As a result, the loading of the liquefied gas can be started at a proper timing.

The first temperature detection unit 31 forms a part of the main body part 23a of the joining member 23 of the tank main body 20, and can detect the temperature of the joining member 23 to which the skirt 22 is joined.

For this reason, the first temperature detection unit 31 can detect the partition wall temperature T1 at a position adjacent to the joint between the tank main body 20 and the skirt 22.

As a result, a change in the temperature of the tank main body 20 when the precooling of the tank main body 20 is performed can be detected with high sensitivity.

Furthermore, the second temperature detection unit 32 can detect the temperature of the upper part 22a at a side at which the skirt 22 is joined to the main body part 23a of the joining member 23. For this reason, a change in temperature caused by thermal propagation between the main body part 23a of the joining member 23 of the tank main body 20 and the skirt 22 during precooling can be detected at a position adjacent to the joint between the main body part 23a of the joining member 23 and the skirt 22 with high sensitivity.

Furthermore, the upper part 22a at the side at which the skirt 22 is joined to the main body part 23a of the joining member 23 is formed of a material having high thermal conductivity. For this reason, the temperature of the upper part 22a of the skirt 22 is detected by the second temperature detection unit 32. The change in temperature caused by thermal propagation between the main body part 23a of the joining member 23 of the tank main body 20 and the skirt 22 during precooling can be detected with higher sensitivity.

Furthermore, the determination unit 34 can determine whether or not the joint between the tank main body 20 and the skirt 22 is rapidly cooled by the liquefied gas on the basis of whether or not the partition wall temperature T1 and the temperature difference ΔT are within a range within which the stress generated at the joint between the main body part 23a of the joining member 23 and the skirt 22 when the liquefied gas is loaded into the tank main body 20 is lower than or equal to a predetermined reference value. For this reason, the time required for the precooling performed during the loading of the liquefied gas can be shortened, and the loading of the liquefied gas can be started in an early stage.

Second Embodiment

Next, a second embodiment of the liquefied gas-based rapid cooling possibility determination device, the liquefied gas storage tank, the liquefied gas carrying vessel, or the liquefied gas-based rapid cooling possibility determination method according to the present invention will be described.

In the second embodiment to be described below, since only the constitution of the map serving as the basis of determining whether or not the loading is started is different from that of the first embodiment, the same portions as in the first embodiment will be described with the same reference signs, and duplicate description will be omitted.

Figure 6:
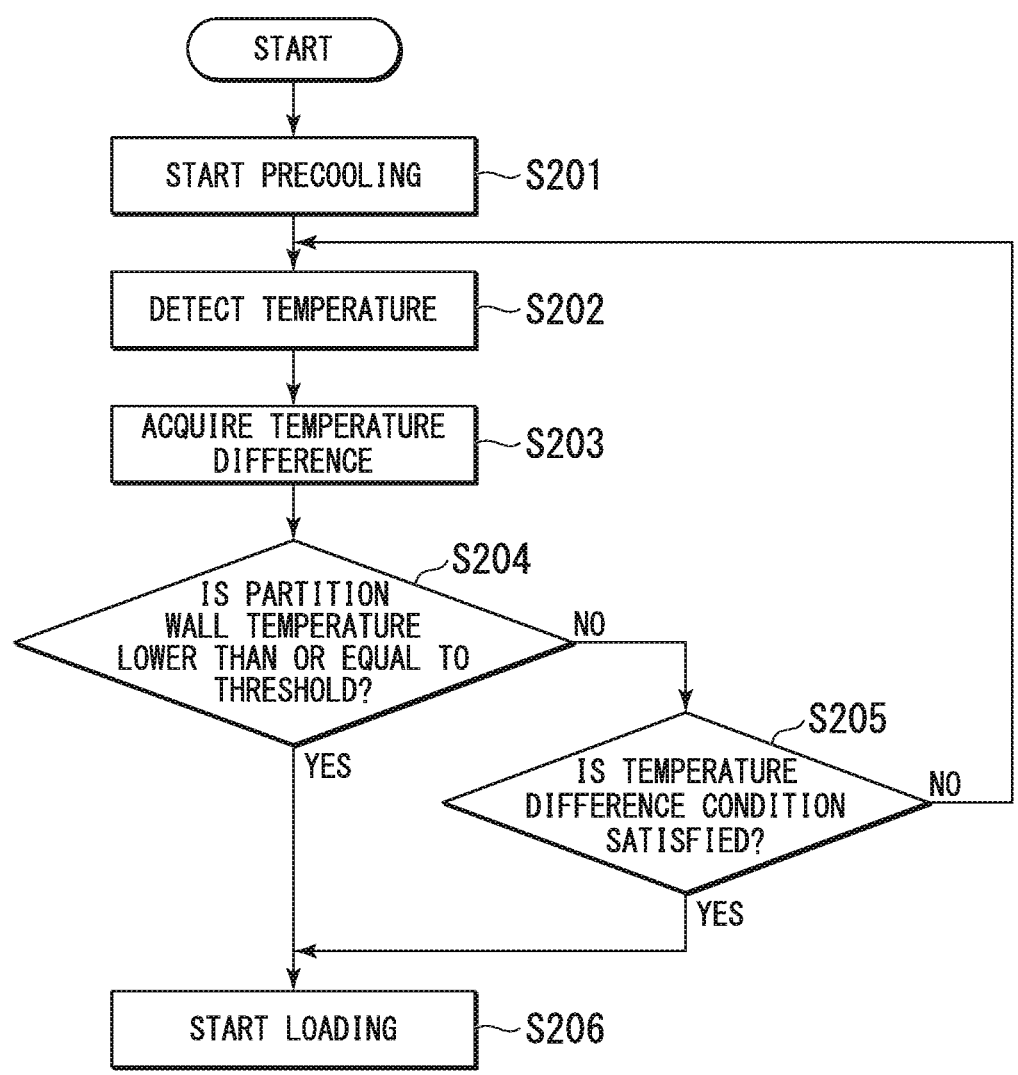
FIG. 6 is a flow chart for control when a tank main body is precooled in a second embodiment of the present invention.

FIG. 6 is a flow chart for control when a tank main body is precooled in a second embodiment of the present invention.

As shown in FIG. 6, before a liquefied gas is loaded into a tank main body 20, precooling of a tank 12 is started (step S201). In this case, a control device 30 causes a liquefied gas of the same type as the liquefied gas to be carried to be sprayed as a coolant from a spray nozzle 21n in the tank main body 20 by a nozzle controller 35. Thereby, the tank main body 20 is cooled. Furthermore, a skirt 22 is cooled via a joining member 23.

The control device 30 detects a partition wall temperature T1 of the tank main body 20 and a skirt temperature T2 of the skirt 22 at a first temperature detection unit 31 and a second temperature detection unit 32 at regular predetermined time intervals (step S202).

Next, the control device 30 calculates (acquires) a temperature difference ΔT (=T1−T2) between the partition wall temperature T1 of the tank main body 20 which is detected by the first temperature detection unit 31 and the skirt temperature T2 of the skirt 22 which is detected by the second temperature detection unit 32 in a temperature difference acquisition unit 33 (step S203).

Subsequently, a determination unit 34 determines whether or not the tank main body 20 is rapidly cooled by the liquefied gas on the basis of the partition wall temperature T1 of the tank main body 20 which is detected in step S202 and the temperature difference ΔT between the partition wall temperature T1 of the tank main body 20 and the skirt temperature T2 of the skirt 22 which is detected in step S203, and whether or not the loading of the liquefied gas into the tank main body 20 is possible.

Here, it is first determined whether or not the partition wall temperature T1 of the tank main body 20 which is detected in step S202 is lower than or equal to a predetermined threshold Z, for example −100° C. (step S204).

If the result of the determination indicates that the partition wall temperature T1 is lower than or equal to the threshold Z (T1≥Z), the determination unit 34 determines that the rapid cooling of the tank main body 20 caused by the liquefied gas is possible, and the loading of the liquefied gas into the tank main body 20 is possible.

Figure 7:
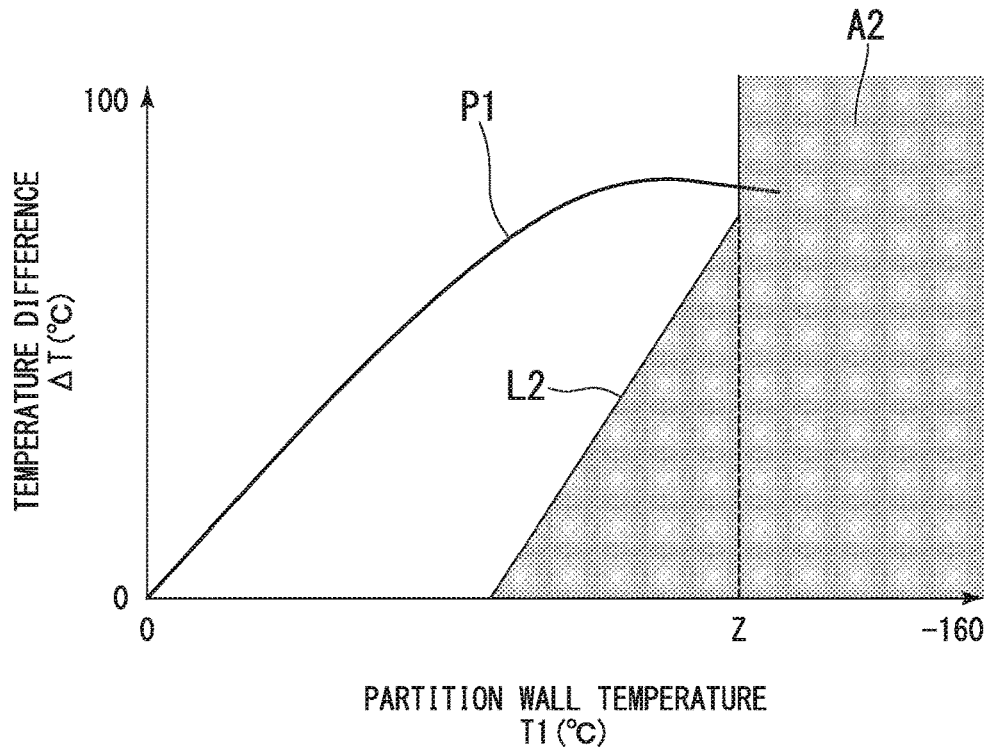
FIG. 7 is a view showing an example of a correlation map corresponding to FIG. 5 in the second embodiment.

Meanwhile, in the case where the partition wall temperature T1 is not the threshold or less, it is subsequently determined whether or not a predetermined precooling completion condition is satisfied, for example, according to a correlation map between the partition wall temperature T1 and the temperature difference ΔT as shown in FIG. 7 (step S205). In FIG. 7, a threshold line L2 is expressed by, for example, Formula (2) below.

$$Y = a \times X + b, \text{ and } X < Z \qquad (2)$$

Here, a and b are preset coefficients.

In the correlation map shown in FIG. 7, if a point determined by the partition wall temperature T1 and the temperature difference ΔT detected and acquired in steps S202 and S203 beyond the threshold line L2, and falls within a range A2 that satisfies the precooling completion condition, the determination unit 34 determines that the rapid cooling of the tank main body 20 caused by the liquefied gas is possible, and the loading of the liquefied gas into the tank main body 20 is possible.

In step S204 or S205, in the case where it is determined in the determination unit 34 that the rapid cooling of the tank main body 20 caused by the liquefied gas is possible, and the loading of the liquefied gas is possible, the pump controller 36 switches on a pump (not shown) that feeds the liquefied gas into the tank main body 20 from a gas feed pipe (not shown). Thereby, the loading of the liquefied gas into the tank main body 20 is started (step S206).

In this case, the nozzle controller 35 may be configured to stop a spraying operation of the precooling coolant from the spray nozzle 21n, and to stop precooling treatment of the tank main body 20.

Therefore, according to the aforementioned second embodiment, like the first embodiment, it is determined whether or not the joint between the tank main body 20 and the skirt 22 is rapidly cooled by the liquefied gas on the basis of the partition wall temperature T1 of the tank main body 20 and the temperature difference ΔT between the partition wall temperature T1 and the skirt temperature T2 of the skirt 22. Thereby, a time required for the precooling performed during the loading of the liquefied gas can be shortened, and the loading of the liquefied gas can be started in an early stage. Therefore, the loading of the liquefied gas into the tank main body 20 can be started at a proper timing.

The determination unit 34 determines that the loading of the liquefied gas into the tank main body 20 is possible when the partition wall temperature T1 is lower than or equal to a predetermined reference value. For this reason, even in the state in which the temperature difference ΔT between the partition wall temperature T1 of the tank main body 20 and the skirt temperature T2 of the skirt 22 is large, the loading of the liquefied gas into the tank main body 20 can be started in an early stage if the partition wall temperature T1 is lower than or equal to the predetermined reference value.

Next, a method of obtaining Formulae (1) and (2) for setting the threshold lines L1 and L2 exemplified in the aforementioned first and second embodiments will be described.

Figure 8:
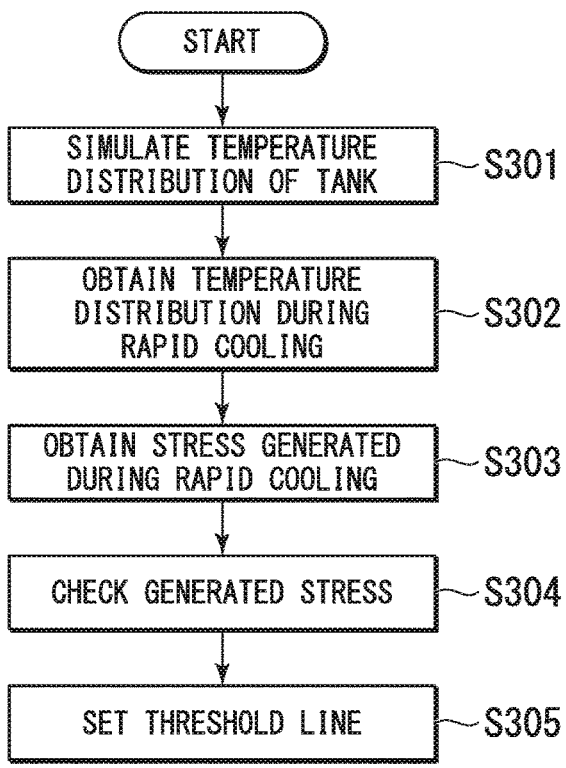
FIG. 8 is a flow chart of a method of setting a threshold line for determining whether or not it is possible to load the liquefied gas into the tank.

FIG. 8 is a flow chart of a method of setting a threshold line for determining whether or not it is possible to load the liquefied gas into the tank.

As shown in FIG. 8, first, temperature distribution of the tank main body 20, the joining member 23, and the skirt 22 in the state in which the precooling is performed on the tank 12 or in the state in which the carrying vessel 10 is under sail is simulated by, for example, a finite element method (FEM) analysis (step S301).

Next, the temperature distribution obtained in step S301 is set as an initial condition, and temperature distribution of the case where the joining member 23 is rapidly cooled by the liquefied gas when the liquefied gas is loaded into the tank main body 20 or when the liquefied gas is fluctuated in the tank main body 20 under sail is simulated by an FEM analysis (step S302).

Next, stress, which is generated at the boundary portion between the main body part 23a of the joining member 23 and the skirt joint 23b when the temperature distribution obtained during rapid cooling in step S302 is given to the joining member 23 as a thermal load, is obtained (step S303).

Subsequently, it is checked that the stress obtained in step S303 falls within a predetermined reference value (step S304).

The temperature distribution in which the rapid cooling is permitted is specified in the joining member 23 according to a series of processes of steps S301 to S304, and Formulae (1) and (2) for setting the threshold lines L1 and L2 are obtained (step S305).

Other Modifications

The present invention is not limited to the aforementioned embodiments, and includes modifying the aforementioned embodiments in various ways without departing from the spirit and scope of the present invention. That is, the specific shape and constitution represented in the embodiments are merely examples, and can be appropriately modified.

For example, in FIGS. 5 and 7, the threshold lines L1 and L2 are given as an example. However, threshold lines other than those given as an example may be used as long as it is determined whether or not the liquefied gas is loaded on the basis of the partition temperature T1 and the temperature difference ΔT.

Furthermore, the temperature of the joining member 23 is configured to be detected as the partition wall temperature T1. However, a temperature of another part may be configured to be detected as long as the temperature of the partition wall of the tank main body 20 can be detected.

Furthermore, the skirt temperature T2 may also be configured to be detected at a part other than the upper part 22a of the skirt 22.

In each of the above embodiments, it is determined whether or not the joint between the tank main body 20 and the skirt 22 is rapidly cooled by the liquefied gas on the basis of the partition wall temperature T1 and the temperature difference ΔT between and the partition wall temperature T1 and the skirt temperature T2, but the present invention is not limited thereto. To determine whether or not the joint between the tank main body 20 and the skirt 22 is rapidly cooled by the liquefied gas need only be performed on the basis of at least two of the partition wall temperature the skirt temperature T2, and the temperature difference ΔT. For example, it is determined whether or not the joint between the tank main body 20 and the skirt 22 may be rapidly cooled by the liquefied gas on the basis of the skirt temperature T2 and the temperature difference ΔT. It is determined whether or not the joint between the tank main body 20 and the skirt 22 may be rapidly cooled by the liquefied gas on the basis of the partition wall temperature T1 and the skirt temperature T2 of the skirt 22.

In each of the above embodiments, it is determined whether or not the tank is rapidly cooled by the liquefied gas, and thereby it is determined whether or not the liquefied gas is loaded. However, an application of the result of determining whether or not the rapid cooling is possible is not limited thereto.

INDUSTRIAL APPLICABILITY

According to the liquefied gas-based rapid cooling possibility determination device, the liquefied gas storage tank, the liquefied gas carrying vessel and the liquefied gas-based rapid cooling possibility determination method, it can be properly determined whether or not the joint between the tank and the support member is rapidly cooled by the liquefied gas.

REFERENCE SIGNS LIST

10 Carrying vessel (liquefied gas carrying vessel)
11 Hull
11a Upper deck

11b Bottom
11c Bow
11d Stern
12 Tank (liquefied gas storage tank)
13 Tank cover
14 Tank housing
15 Housing recess
16 Foundation deck
20 Tank main body
20a Upper part
20b Bottom
20t Top
21 Pipe tower
21n Spray nozzle (precooling part)
22 Skirt (support member)
22a Upper part
22b Middle part
22c Lower part
23 Joining member
23a Main body part
23b Skirt joint
30 Control device (liquefied gas-based rapid cooling possibility determination device)
31 First temperature detection unit
32 Second temperature detection unit
33 Temperature difference acquisition unit
34 Determination unit
35 Nozzle controller
36 Pump controller
A1 Range
A2 Range
L1, L2 Threshold line
P1 Change curve
T1 Partition wall temperature (temperature of partition wall)
T2 Skirt temperature (temperature of support member)
Z Threshold
ΔT Temperature difference

The invention claimed is:

1. A liquefied gas-based rapid cooling possibility determination device comprising:
a first temperature detection unit configured to form a part of a partition wall of a tank in which liquefied gas is contained and to detect a temperature of a joining member to which a support member is joined that supports the tank;
a second temperature detection unit configured to detect a temperature of the support member;
a temperature difference acquisition unit configured to acquire a temperature difference between the temperature of the joining member which is detected by the first temperature detection unit and the temperature of the support member which is detected by the second temperature detection unit; and
a determination unit configured to determine whether or not the joining member is rapidly cooled by the liquefied gas, on the basis of at least two of the temperature of the joining member, the temperature of the support member, and the temperature difference.

2. The liquefied gas-based rapid cooling possibility determination device according to claim 1, wherein the second temperature detection unit detects a temperature of an upper part of the support member.

3. The liquefied gas-based rapid cooling possibility determination device according to claim 2, wherein the support member is configured such that an end thereof at a side joined to the joining member has higher thermal conductivity than a portion thereof at a side separated from the joining member.

4. The liquefied gas-based rapid cooling possibility determination device according to claim 1, wherein the determination unit determines whether or not the joining member is rapidly cooled by the liquefied gas, on the basis of whether or not the temperature of the joining member or the support member and the temperature difference are within a range within which stress generated in the joining member when the tank is cooled by the liquefied gas is set to be lower than or equal to a predetermined reference value.

5. The liquefied gas-based rapid cooling possibility determination device according to claim 4, wherein the determination unit determines that rapid cooling of the tank caused by the liquefied gas into the tank is possible when the temperature of the joining member is set to be lower than or equal to the predetermined reference value.

6. A liquefied gas storage tank comprising:
a tank main body configured to store liquefied gas;
a support member configured to support the tank main body;
a precooling part configured to precool the tank main body;
a gas feeder configured to feed the liquefied gas to the tank main body; and
the liquefied gas-based rapid cooling possibility determination device defined by claim 1.

7. A liquefied gas carrying vessel comprising:
the liquefied gas storage tank defined by claim 6; and
a hull in which the liquefied gas storage tank is mounted.

8. A liquefied gas-based rapid cooling possibility determination method comprising:
a step of forming a part of a partition wall of a tank in which liquefied gas is contained and detecting a temperature of a joining member to which a support member is joined that supports the tank;
a step of detecting a temperature of the support member;
a step of acquiring a temperature difference between the temperature of the joining member and the temperature of the support member; and
a step of determining whether or not the joining member is rapidly cooled by the liquefied gas, on the basis of at least two of the temperature of the joining member, the temperature of the support member, and the temperature difference.

* * * * *